United States Patent Office 3,456,560
Patented July 22, 1969

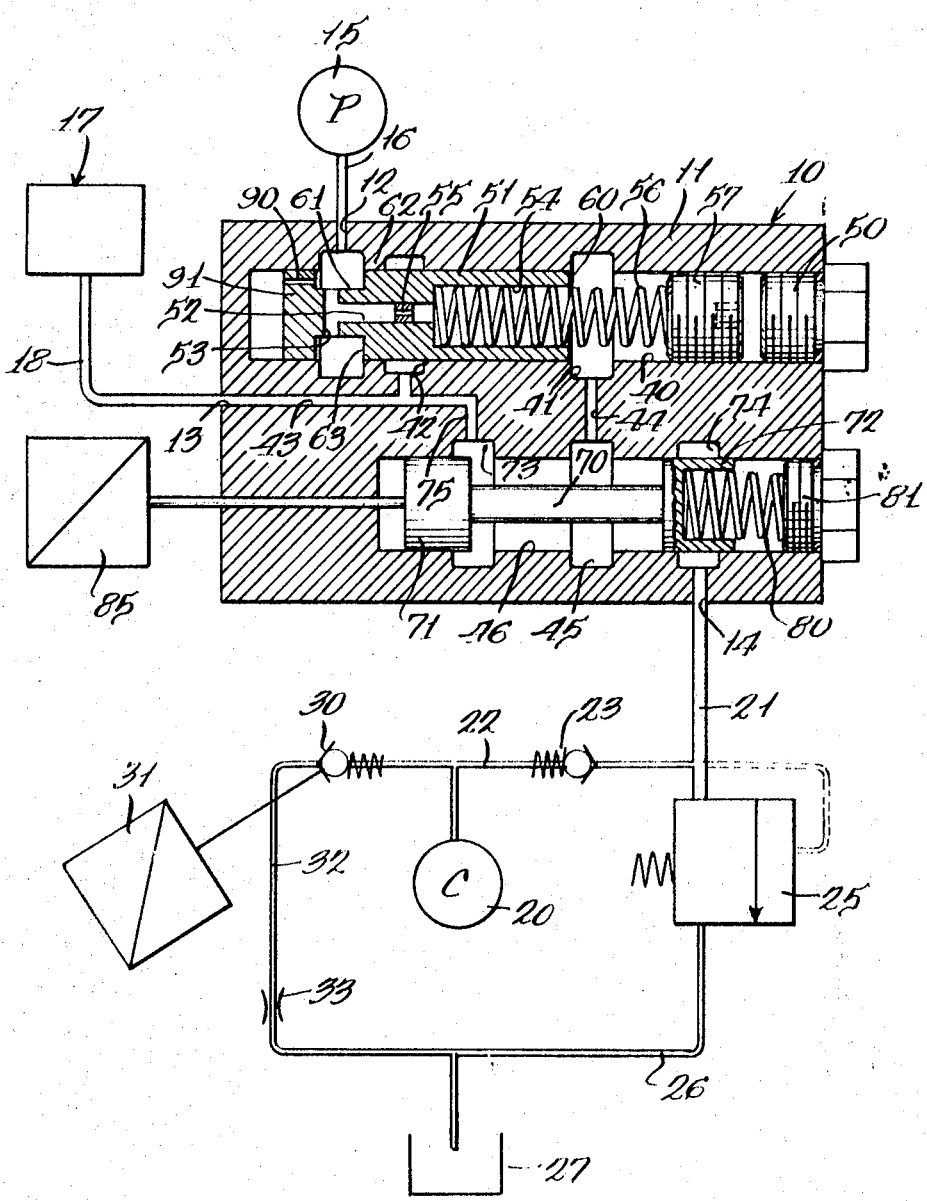

3,456,560
SELECTIVE PRIORITY FLOW CONTROL SYSTEM
Edward O. Brannon, Racine, Wis., assignor to Racine Hydraulics, Inc., a corporation of Wisconsin
Filed Feb. 1, 1968, Ser. No. 702,326
Int. Cl. F15b *11/20, 15/18;* G05d *16/10*
U.S. Cl. 91—412         8 Claims

ABSTRACT OF THE DISCLOSURE

A selective priority flow control system for connection between a fluid pump and two motors with one in a fluid excess circuit and the other in a priority circuit comprising, a flow controlling flow divider valve having two outlets with one connectable to the excess circuit and a recombining valve connectable to the other outlet, with the recombining valve in one position causing fluid flowing therethrough to pass to a priority circuit and in the other position causing recombining of fluid with that flowing to the excess circuit.

BACKGROUND OF THE INVENTION

This invention relates to selective priority flow control systems and valves for such systems wherein fluid flow to a priority circuit is assured regardless of fluid demands for an alternate excess flow circuit.

In the known prior art, provision has been made for supplying fluid to a priority circuit. However, when there is no demand for fluid in the priority circuit, the fluid intended therefor is merely dumped to tank, thus resulting in a horsepower loss.

SUMMARY

An object of this invention is to provide a new and improved selective priority flow control system wherein priority circuit fluid is combined with fluid in the excess circuit when there is no demand for fluid in the priority circuit in order to avoid dumping priority circuit fluid to tank with resultant horsepower losses.

Another object of the invention is to provide a selective priority flow control system for connection between a fluid pump and two motors with one being in a fluid excess circuit and the other in a priority circuit comprising, a flow controlling, flow divider valve having an inlet for fluid connection to the pump and a pair of outlets with an outlet connectable to said excess circuit, and recombining valve having an inlet connected to the other of the pair of outlets and a pair of outlet passages with one connected to the excess circuit and the other connected to the priority circuit with a recombining valve member selectively operable to permit priority flow to the priority circuit or to recombine the priority fluid with the flow to the excess circuit.

Still another object of the invention is to provide a selective priority flow control valve having a valve body with a valve bore and a pair of first and second outlets from the bore of the body with a flow controlling, flow divider valve member movable in the bore, means including a spring acting on the valve member and an orifice for establishing a controlled pressure drop between the inlet and the first outlet, and a second bore in the valve body with a three-way valve member in the latter bore for permitting flow from the first outlet to a priority circuit or for recombining flow from the first outlet with flow from said second outlet.

A further object of the invention is to provide a valve as defined in the preceding object wherein the flow divider valve member has a pair of surfaces coacting with the first and second outlets whereby flow is metered at the first outlet when the pressure at the second outlet exceeds that at the first outlet and flow is metered at the second outlet when the pressure at the first outlet exceeds that at the second outlet.

Further objects and advantages will become apparent from the following detailed description taken in connection with the accompanying drawings.

DRAWING DESCRIPTION

The figure shows the selective priority flow control system with parts thereof illustrated diagrammatically by symbols and with the selective priority flow control valve shown in vertical central section.

DESCRIPTION OF A PREFERRED EMBODIMENT

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The selective priority flow control system is shown in the drawing and includes a selective priority flow control valve indicated generally at 10 having a valve body 11 with an inlet port 12 and a pair of outlet connections 13 and 14.

An entire system includes a pressure fluid source, such as a pump 15, connectable to the inlet 12 by a line 16; an excess fluid system indicated generally at 17 and including a motor such as a cylinder which communicates with the outlet connection 13 through a line 18. The excess fluid circuit 17 also includes suitable valving, as known in the art, for controlling the supply of fluid to the motor of this circuit.

The outlet connection 14 is provided for a priority circuit which has priority on the flow of fluid delivered by the pump 15. The priority circuit includes a motor 20, such as a cylinder, for operating a load when desired, with the cylinder being supplied through lines 21 and 22 extending to the outlet connection 14 and including a check valve 23 permitting flow to the cylinder, but preventing reverse flow from the cylinder back to the priority flow control valve 10. A pressure relief valve 25 in line 21 determines the maximum pressure for the fluid in the priority circuit and has an outlet connected by line 26 to tank 27.

When fluid is to flow from the motor 20, a valve 30 is opened by operation of a solenoid 31, shown diagrammatically, to permit flow through a line 32 and an orifice 33 to the tank 27. The orifice 33 functions to restrict the rate of flow through the line 32 and thus the rate of movement of the motor cylinder 20.

With the system as herein described, there is fluid available for the priority circuit when the pump 15 is operating and regardless of whether or not there is flow to the excess circuit mechanism 17.

The selective priority flow control valve 10 has a first bore 40 with which the inlet 12 communicates. This bore has a first outlet 41 and a second outlet 42 spaced from each other. The second outlet 42 communicates with the outlet connection 13 from the valve body through a passage 43, while the first outlet 41, through a passage 44, communicates with an inlet 45 in the form of an annular passage surrounding a second bore 46 in the valve body 11.

The first bore 40 has a closed end and an opposite open end sealed by a threaded cap 50, with a flow control valve member 51 movable therein. The body of the valve member is provided with a longitudinal passage extending for a portion of the length thereof which at one end communicates with a transverse passage 53. In all positions of the valve member, the transverse passage 53 is in communication with the inlet 12 and at its other end communicates with a cylindrical recess 54 in the valve member. By these passages, there is continuous fluid communication from the valve body inlet 12 to the section of the bore 40 communicating with the first outlet 41 to provide a source of fluid for the priority circuit at all times when the pump is operating.

Means are provided to establish a pressure drop between the inlet 12 and the outlet 41 including an orifice member 55 positioned in the passage 52 of the valve member and this orifice with a spring 56 sets the value of the pressure drop to be obtained and therefore the rate of fluid flow to the first outlet 41. The setting of the spring 56 is determined by a threaded abutment 57 threaded into the bore 40 and which abuts against one end of the spring 56 with the other end of the spring abutting the interior of the valve member 51 and seated within the cylindrical recess 54 of the valve member. An end 60 of the valve member 51 defines a surface coacting with the first outlet 41 to meter flow to the outlet 41 under certain operating conditions, as subsequently described.

An annular recess 61 in the valve member 51 surrounds the transverse passage 53 whereby movement of the valve member to the right, as viewed in the figure, in an amount sufficient to uncover the land 62 formed in the valve bore results in connecting the inlet 12 to the second outlet 42 whereby fluid can flow to the excess circuit 17 from outlet 13. An annular face 63 of the valve member 51 has an edge defining a surface coacting with the outlet 42 to modulate flow to this outlet under certain conditions to be described.

A primary feature of the invention is the avoidance of fluid flow for the priority circuit being dumped to tank, resulting in a horsepower loss. This is accomplished by selectively recombining the priority fluid flow with the flow to the excess circuit if there is no demand in the priority circuit. This is accomplished by the use of a recombining valve 70 in the form of a three-way valve having lands 71 and 72 at opposite ends thereof which coact with annular grooves 73 and 74 formed in the valve body 11. The outlet groove 73 is connected by a passage 75 in the valve body to the passage 43 for excess circuit flow. The annular groove 74 communicates with the outlet connection 14 for the priority circuit. As shown in the figure, a spring 80 fitted in an end of the bore 46 against a threaded cap 81 urges the valve member 70 toward the left to place the inlet 45 in communication with the outlet groove 73 whereby priority flow from the flow control valve member 51 will flow to the excess circuit 17. This results in recombining priority fluid flow with the flow to the excess circuit to avoid any significant horsepower loss. When the priority circuit requires fluid, a solenoid 85 is energized to shift the valve member 70 against the spring 80 and block the outlet groove 73 and connect the outlet groove 74 to the inlet 45 of the three-way valve whereby priority fluid flow can flow from the outlet 14 to the priority circuit.

When the pump 15 is operating and there is no load on the excess circuit 17, then the pressure at the inlet 12, if any, will be that established by the motor 20 of the priority circuit, plus the amount of the pressure drop through the flow control valve member 51. The metering action of the flow control valve member will be accomplished between the surface defined at the edge of the annular face 63 of the valve member 51 and an edge of the second outlet 42 from valve bore 40. This also occurs so long as the pressure of fluid supplied to the excess circuit is less than the pressure at the first outlet 41 from the valve bore 40. When the pressure of fluid in the excess circuit and, therefore, pressure at the second outlet 42 exceeds that at the first outlet 41, then the metering action of the flow control valve occurs between the surface 60 at an end of the valve member 51 and an edge of the first outlet 41.

Means are provided to modulate the movement of the flow control valve member 51 by utilizing the closed end of the valve bore 40. This closed end is in communication with the inlet 12 by a passage 90 formed in a land 91 at an end of the valve member 51.

With the system disclosed herein, the fluid flow for the priority circuit is combined with flow to the excess circuit 17 when not required for the priority circuit to avoid dumping this fluid to tank and thus avoiding a horsepower loss, while still permitting maximum utilization of fluid passing through the selective priority flow control valve.

I claim:

1. A selective priority flow control system comprising a pump; a priority circuit including an optionally operable motor; an excess circuit having a motor; a flow controlling flow divider valve having a valve body with a bore having first and second outlets, a fluid inlet to said bore, a valve member having spaced surfaces positioned to coact with said first and second outlets respectively, and spring and orifice means creating a pressure drop and measured flow between said inlet and said first outlet; conduit means connecting said second outlet to said excess circuit; and means including a selectively operable valve in fluid communication with said first outlet to alternately connect said first outlet to either said priority circuit or said excess circuit whereby said fluid for satisfying the priority circuit is supplied to the excess circuit when not required by the priority circuit.

2. A system as defined in claim 1 wherein said priority circuit includes a check valve preventing reverse flow toward said inlet and a restricted flow path from said optionally operable motor openable to permit controlled movement of the last mentioned motor by controlling fluid flow therefrom.

3. A selective priority flow control system for connection between a fluid pump and two motors with one being in a fluid excess circuit and the other in a priority circuit, comprising: a flow controlling flow divider valve having an inlet for fluid connection to said pump and a pair of outlets with a first outlet connectable to said excess circuit; and a recombining valve having an inlet connected to the second of said pair of outlets, a pair of outlet passages with one connected to said excess circuit and the other connected to said priority circuit, and a selectively operable valve member operable in one position to permit priority flow to said priority circuit and in the other position to recombine said priority flow with the flow to said excess circuit to avoid any significant loss of horsepower.

4. A selective priority flow control valve comprising: a valve body having a first bore with an inlet, and a pair of spaced apart first and second outlets from said bore; a flow controlling flow divider valve member movable in said bore and having a first surface coacting with said first outlet; means including a spring acting on said valve member and an orifice for establishing a controlled pressure drop between said inlet and the first outlet; a second bore in said valve body; and a three-way valve member in said second bore for permitting flow from the first outlet to a priority circuit or for recombining flow from said first outlet with flow from said second outlet.

5. A valve as defined in claim 4 wherein said flow divider valve member has a surface coacting with said second outlet whereby flow is metered at said first outlet when the pressure at the second outlet exceeds that at the first outlet and flow is metered at said second outlet when the pressure at the first outlet exceeds that at the second outlet.

6. A valve as defined in claim 5 wherein said flow divider valve member has a land at one end thereof closing off an end of said bore; and means for connecting said end of the bore to the inlet to modulate movement of said flow divider valve member.

7. A valve as defined in claim 6 wherein said connecting means is a passage through said land.

8. A valve as defined in claim 5 including a solenoid operatively connected to said three-way valve member for positioning thereof.

References Cited

UNITED STATES PATENTS

| | | | |
|---|---|---|---|
| 2,363,179 | 11/1944 | Harrington et al. | 91—412 |
| 2,737,196 | 3/1956 | Eames | 91—412 |
| 2,859,762 | 11/1958 | Banker | 137—101 |
| 2,995,141 | 8/1961 | Hipp | 137—101 |

EDGAR W. GEOHEGAN, Primary Examiner

U.S. Cl. X.R.

60—52; 137—101